(12) United States Patent
Frank

(10) Patent No.: US 12,489,632 B1
(45) Date of Patent: Dec. 2, 2025

(54) SYSTEMS AND METHODS FOR ORCHESTRATION OF CRYPTOGRAPHIC TOKEN OPERATIONS

(71) Applicant: Tassat Group Inc., New York, NY (US)

(72) Inventor: Andre Frank, Irvington, NY (US)

(73) Assignee: TASSAT GROUP INC., New York, NY (US)

(*) Notice: Subject to any disclaimer, the term of this patent is extended or adjusted under 35 U.S.C. 154(b) by 0 days.

(21) Appl. No.: 18/825,854

(22) Filed: Sep. 5, 2024

(51) Int. Cl.
*H04L 29/06* (2006.01)
*H04L 9/00* (2022.01)
*H04L 9/32* (2006.01)

(52) U.S. Cl.
CPC .............. *H04L 9/3213* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2018/0191503 | A1* | 7/2018 | Alwar | H04L 9/3242 |
| 2019/0236594 | A1* | 8/2019 | Ehrlich-Quinn | G06Q 20/401 |
| 2020/0201679 | A1* | 6/2020 | Wentz | G06F 9/468 |
| 2020/0396065 | A1* | 12/2020 | Gutierrez-Sheris | H04L 9/3297 |
| 2021/0119807 | A1* | 4/2021 | Chen | H04L 9/3242 |
| 2021/0390531 | A1* | 12/2021 | Voorhees | G06Q 20/367 |
| 2022/0058732 | A1* | 2/2022 | Reses | G06Q 20/065 |
| 2022/0405748 | A1* | 12/2022 | Coughlan | G06Q 20/3827 |
| 2023/0120534 | A1* | 4/2023 | Jakobsson | H04L 9/50 705/39 |
| 2023/0325814 | A1* | 10/2023 | Vijayan | G06Q 20/3829 705/66 |
| 2023/0394063 | A1* | 12/2023 | Zhang | G06F 16/27 |
| 2024/0013213 | A1* | 1/2024 | Trock | G06Q 20/401 |

* cited by examiner

*Primary Examiner* — Ali H. Cheema
*Assistant Examiner* — Hassan A Hussein
(74) *Attorney, Agent, or Firm* — Greenberg Traurig, LLP

(57) ABSTRACT

Systems and methods detailed herein enable improved token event orchestration. To do so, the systems and methods determine, using an oracle construct associated with monitoring a real-world condition, a trigger condition associated with creating new cryptographic tokens. The systems and methods create the new cryptographic tokens in cryptographic data record addresses in response to the trigger condition. Creation of the new cryptographic tokens may include determining a block height of the blocks added to the cryptographic data record since a previous trigger condition, determining a portion of the new cryptographic tokens for each block based on the block height, determining, for each cryptographic data record address in each block, a sub-portion of the portion of the new cryptographic tokens for each block, and generating, into each cryptographic data record address in each block, the sub-portion of the portion of the new cryptographic tokens.

20 Claims, 4 Drawing Sheets

SYSTEMS AND METHODS FOR ORCHESTRATION OF CRYPTOGRAPHIC TOKEN OPERATIONS

FIELD OF TECHNOLOGY

The present disclosure generally relates to computer-based systems and methods for orchestration of cryptographic token operations, including monitoring of cryptographic ledger activity and external system activity to automatically orchestrate token events.

BACKGROUND OF TECHNOLOGY

Decentralized computing platforms operate across numerous peer computing nodes, often without a central authority. Examples include BitTorrent, ad hoc mesh networking, and blockchain technologies like Ethereum, Hyperledger, Cardano, and NEO.

Some platforms are Turing complete, supporting decentralized applications written in various programming languages. They can be permissioned (restricted access) or permissionless (open access). Benefits include resilience to node failures, solving the Byzantine general problem, and enabling smart contracts. However, they often have higher computational costs compared to traditional distributed applications.

SUMMARY

In some aspects, the techniques described herein relate to a method including: determining, by at least one processor, using at least one cryptographic data record oracle associated with monitoring at least one real-world condition, a trigger condition associated with creating new cryptographic tokens on a cryptographic data record; and creating, by the at least one processor, the new cryptographic tokens into a plurality of cryptographic data record addresses in response to the trigger condition, the creating including: determining, by the at least one processor, a block height of the blocks added to the cryptographic data record since a previous trigger condition; determining, by the at least one processor, a portion of the new cryptographic tokens for each block based at least in part on the block height; determining, by the at least one processor, for each cryptographic data record address in each block from the plurality of cryptographic data record address, a sub-portion of the portion of the new cryptographic tokens for each block; and generating, by the at least one processor, into each cryptographic data record address in each block, the sub-portion of the portion of the new cryptographic tokens.

In some aspects, the techniques described herein relate to a method, further including: retrieving, by the at least one processor, on a periodic basis, the at least one real-world condition from the at least one cryptographic data record oracle.

In some aspects, the techniques described herein relate to a method, wherein the periodic basis includes a one-day period.

In some aspects, the techniques described herein relate to a method, wherein the trigger condition includes a period of the periodic basis having elapsed.

In some aspects, the techniques described herein relate to a method, wherein the trigger condition includes a cryptographic token creation period having elapses, the cryptographic token creation period being different from a period of the periodic basis having elapsed.

In some aspects, the techniques described herein relate to a method, further including: generating, by the at least one processor, a new block on the cryptographic data record based at least in part on a validation of the new cryptographic tokens according to at least one consensus protocol; wherein the cryptographic data record includes a blockchain; and wherein the new block includes a plurality of transactions representative of the generating of the sub-portion of the portion of the new cryptographic tokens in each cryptographic data record address.

In some aspects, the techniques described herein relate to a method, further including: determining, by the at least one processor, the portion of the new cryptographic tokens for each block based at least in part on a total cryptographic token balance of each block; and determining, by the at least one processor, for each cryptographic data record address in each block from the plurality of cryptographic data record address, a sub-portion of the portion of the new cryptographic tokens for each block based at least in part on an address-specific token balance of each cryptographic data record address in each block.

In some aspects, the techniques described herein relate to a non-transitory computer-readable medium having software instructions stored thereon, wherein the software instructions are configured to, upon execution, cause at least one processor to perform a method including: determining, using at least one cryptographic data record oracle associated with monitoring at least one real-world condition, a trigger condition associated with creating new cryptographic tokens on a cryptographic data record; and creating the new cryptographic tokens into a plurality of cryptographic data record addresses in response to the trigger condition, the creating including: determining a block height of the blocks added to the cryptographic data record since a previous trigger condition; determining a portion of the new cryptographic tokens for each block based at least in part on the block height; determining for each cryptographic data record address in each block from the plurality of cryptographic data record address, a sub-portion of the portion of the new cryptographic tokens for each block; and generating into each cryptographic data record address in each block, the sub-portion of the portion of the new cryptographic tokens.

In some aspects, the techniques described herein relate to a non-transitory computer-readable medium, wherein the method further includes: retrieving on a periodic basis, the at least one real-world condition from the at least one cryptographic data record oracle.

In some aspects, the techniques described herein relate to a non-transitory computer-readable medium, wherein the periodic basis includes a one-day period.

In some aspects, the techniques described herein relate to a non-transitory computer-readable medium, wherein the trigger condition includes a period of the periodic basis having elapsed.

In some aspects, the techniques described herein relate to a non-transitory computer-readable medium, wherein the trigger condition includes a cryptographic token creation period having elapses, the cryptographic token creation period being different from a period of the periodic basis having elapsed.

In some aspects, the techniques described herein relate to a non-transitory computer-readable medium, wherein the method further includes: generating a new block on the cryptographic data record based at least in part on a validation of the new cryptographic tokens according to at least one consensus protocol; wherein the cryptographic data record includes a blockchain; and wherein the new block includes a plurality of transactions representative of the generating of the sub-portion of the portion of the new cryptographic tokens in each cryptographic data record address.

In some aspects, the techniques described herein relate to a non-transitory computer-readable medium, wherein the method further includes: determining the portion of the new cryptographic tokens for each block based at least in part on a total cryptographic token balance of each block; and determining for each cryptographic data record address in each block from the plurality of cryptographic data record address, a sub-portion of the portion of the new cryptographic tokens for each block based at least in part on an address-specific token balance of each cryptographic data record address in each block.

In some aspects, the techniques described herein relate to a system including: at least one processor in communication with at least one non-transitory computer readable medium having software instructions stored thereon, wherein the at least one processor, upon execution of the software instructions, is configured to perform steps including: determining, using at least one cryptographic data record oracle associated with monitoring at least one real-world condition, a trigger condition associated with creating new cryptographic tokens on a cryptographic data record; and creating the new cryptographic tokens into a plurality of cryptographic data record addresses in response to the trigger condition, the creating including: determining a block height of the blocks added to the cryptographic data record since a previous trigger condition; determining a portion of the new cryptographic tokens for each block based at least in part on the block height; determining for each cryptographic data record address in each block from the plurality of cryptographic data record address, a sub-portion of the portion of the new cryptographic tokens for each block; and generating into each cryptographic data record address in each block, the sub-portion of the portion of the new cryptographic tokens.

In some aspects, the techniques described herein relate to a system, wherein the steps further include: retrieving on a periodic basis, the at least one real-world condition from the at least one cryptographic data record oracle.

In some aspects, the techniques described herein relate to a system, wherein the trigger condition includes a period of the periodic basis having elapsed.

In some aspects, the techniques described herein relate to a system, wherein the trigger condition includes a cryptographic token creation period having elapses, the cryptographic token creation period being different from a period of the periodic basis having elapsed.

In some aspects, the techniques described herein relate to a system, wherein the steps further include: generating a new block on the cryptographic data record based at least in part on a validation of the new cryptographic tokens according to at least one consensus protocol; wherein the cryptographic data record includes a blockchain; and wherein the new block includes a plurality of transactions representative of the generating of the sub-portion of the portion of the new cryptographic tokens in each cryptographic data record address.

In some aspects, the techniques described herein relate to a system, wherein the steps further include: determining the portion of the new cryptographic tokens for each block based at least in part on a total cryptographic token balance of each block; and determining for each cryptographic data record address in each block from the plurality of cryptographic data record address, a sub-portion of the portion of the new cryptographic tokens for each block based at least in part on an address-specific token balance of each cryptographic data record address in each block.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
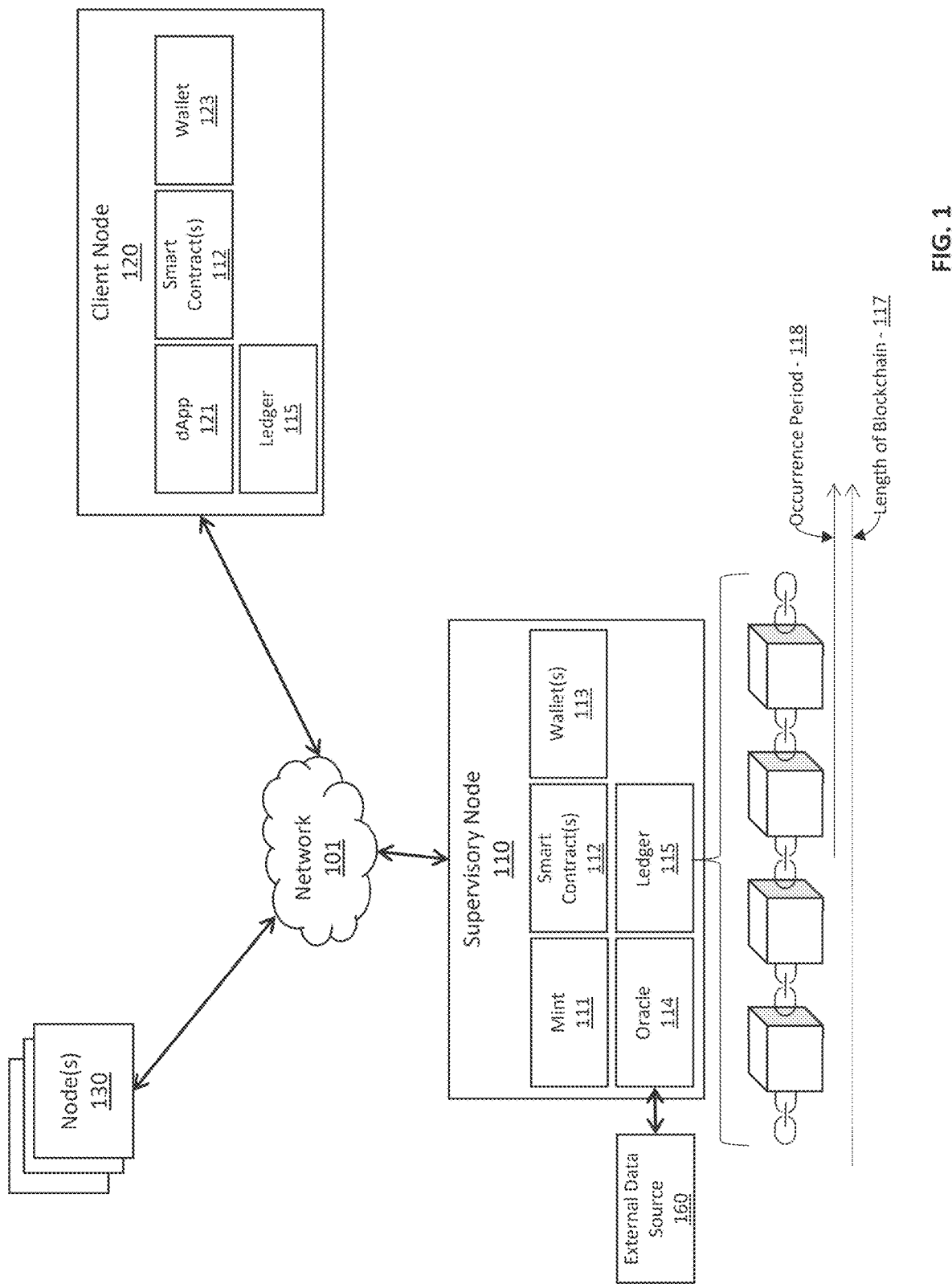
FIG. 1 depicts an exemplary blockchain environment configured to monitoring of on-chain and off-chain events for coordinated token minting and/or distribution events in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 4 illustrate systems and methods of scheduled token minting events based on on-chain and off-chain monitoring and tracking. The following embodiments provide technical solutions and technical improvements that overcome technical problems, drawbacks and/or deficiencies in the technical fields involving blockchain and tokenization whereby the synchronization and/or coordination of on-chain and off-chain events is typically prevented by the asynchronous timing between the on-chain events and the off-chain events. For example, tokens on a blockchain may be used to in certain on-chain activities to represent off-chain activities. However, the on-chain activities and the off-chain activities may occur at different and/or inconsistent times. As explained in more detail, below, technical solutions and technical improvements herein include aspects of improved orchestration of token minting events by leveraging off-chain and on-chain event monitors while computing block and block height metrics associated with the blockchain such that user activity over a period of time defined by the off-chain event can be better determined to enable to enable orchestration of token minting and distribution events. Based on such technical features, further technical benefits become available to users and operators of these systems and methods. Moreover, various practical applications of the disclosed technology are also described, which provide further practical benefits to users and operators that are also new and useful improvements in the art.

A blockchain network, as described here, may be a blockchain-based system. In some cases, the state of a decentralized computing platform is maintained in a tamper-evident acyclic graph of cryptographic hash pointers. Examples of such networks include a structure of blocks linked together (hence, a "blockchain") by cryptographic hash pointers. Each block contains a header that verifies the state of the decentralized platform at a specific time, ensuring that the block and previous blocks (and their data) are considered authoritative by participants.

Some networks use a tree of cryptographic hash pointers to ensure the tamper-evident state of the platform. Each node in this tree verifies the state of the network at a given time, making the node and its predecessors authoritative. The allocation of cryptographic tokens and related processes may be based on the analysis of records stored in the blockchain, with the results also recorded in the blockchain.

In some cases, the state of a decentralized computing platform is considered tamper-evident based on a specific protocol. This means the state is updated at predictable intervals. For instance, in a blockchain-based network, records or their cryptographic hashes are stored in the leaf nodes of Merkle trees within blocks. These blocks are generated according to the network's protocol, ensuring the state of the platform is tamper-evident and updated regularly.

Block generation can follow a predictable schedule, such as every few seconds, minutes, or hours. The state of the decentralized system can be recorded in a data structure at similar intervals, as dictated by the platform's protocol. The time between state updates can be adjusted by changing the difficulty of a proof of work problem or the amount of data stored.

Alternatively, a schedule might be set by selecting high-quality states from a pool of known states and discarding lower quality ones. In some cases, a state must be extended by a certain number of new states to be considered authoritative. The finality of a state can be measured by the number of extensions and the time between updates.

The allocation of cryptographic tokens and related processes may be based on the analysis of records stored in the blockchain. These records are considered authoritative and are selected based on the platform's protocol, which may follow a blockchain-like structure. Some implementations assign value to a state based on the records it contains and a measure of central tendency (like mean, median, or mode) across multiple states.

The ecosystem layer can be implemented on top of a decentralized computing platform, similar to an application layer. This platform supports a set of on-chain functions, which are either implemented by the platform itself or stored in a distributed ledger (like a blockchain) and executed by peer devices, such as smart contracts. These on-chain functions are governed by the platform's protocols.

Additionally, the ecosystem layer may include elements that perform off-chain functions and interact with the decentralized platform. For instance, it might request the execution of a smart contract, providing necessary input data (either off-chain or on-chain), specifying operations (which could involve other smart contracts or off-chain functions), and recording the results in a tamper-evident manner within the platform's state, such as in a blockchain ledger.

In some cases, the decentralized computing platform is an established blockchain-based system, which may already serve functions like those of a cryptocurrency platform, independent of the ecosystem layer. The ecosystem layer can utilize this existing blockchain network to carry out various operations, such as data processing, generation, or storage, within the blockchain network. Examples of such blockchain networks include Ethereum, Hyperledger, Cardano, NEO, and others.

In some embodiments, the term "off-chain" refers to transactions or activities that occur outside the main blockchain network.

In some embodiments, the term "on-chain" refers to transactions or activities that occur within the main blockchain network, including activities submitted and recorded on a blockchain ledger.

Referring to FIG. 1, an exemplary blockchain environment configured to monitoring of on-chain and off-chain events for coordinated token minting and/or distribution events is depicted in accordance with one or more embodiments of the present disclosure.

In some embodiments, users may interact on a decentralized blockchain network 101, including executing transactions, messaging, sharing data, tracking digital and physical items (e.g., via tokenization of the physical items), among other activities. In some embodiments, the users may interface with the decentralized blockchain network 101 via a client node 120, or indirectly. In some embodiments, a supervisory node 110 may also be employed to, e.g., manage blockchain configurations, configure permissions and consensus protocols, among other tasks or any combination thereof.

In some embodiments, nodes, including the supervisory node(s) 110, client node(s) 120 and/or other node(s) 130, may participate in a decentralized blockchain network 101. In some embodiments, the blockchain ledger 115 may include a decentralized and distributed digital ledger that records transactions across multiple nodes, including the supervisory node(s) 110, client node(s) 120 and/or other node(s) 130, This ensures that the recorded transactions cannot be altered retroactively without the alteration of all subsequent blocks and the consensus of the network.

In some embodiments, each node 110, 120 through 130 may include software, hardware or any combination thereof. For example, each node 110, 120 through 130 may be a wholly software-defined entity, or may include hardware infrastructure, or any combination of hardware and/or software. For example, one or more nodes 110, 120 through 130 may include one or more software defined entities hosted on a cloud platform or other server environment. In another example, one or more nodes 110, 120 through 130 may be specific to a particular hardware device and/or system (e.g., a client device such as computing device including a laptop, desktop computer, mobile device, etc., a server, or other device and/or system). In some embodiments, one or more nodes 110, 120 through 130 may share hardware resources, such as being hosted by a common computing platform. Any other arrangement of hardware and/or software in any combination for each or multiple nodes 110, 120 through 130 may be employed.

In some embodiments, the blockchain ledger 115 may include a chain of blocks where each block contains a header and a body. In some embodiments, blocks are linked together using cryptographic hashes. The hash of each block is calculated based on its contents and the hash of the previous block, ensuring integrity and immutability. The header includes metadata such as the previous block's hash, a timestamp, and nonce. The body, or payload, may include transaction data including a list of transactions submitted since a previous block.

In some embodiments, the transactions may include inputs, outputs, and a digital signature. Inputs reference previous transaction outputs, and outputs specify the recipient's address and the amount. A transaction may then be validated by one or more nodes, including the supervisory node(s) 110, client node(s) 120 and/or other node(s) 130, as further detailed below, by checking digital signatures, ensuring inputs are unspent, and verifying adherence to protocol rules.

In some embodiments, each node may be any device (computer, server, etc.) that participates in the blockchain network. Nodes maintain a copy of the blockchain ledger 115 and help validate and relay transactions. The collective set of nodes, including the supervisory node(s) 110, client node(s) 120 and/or other node(s) 130, ensure the network's integrity and security by following the consensus rules, thus requiring that for a transaction to be performed on the blockchain ledger 115, a threshold number of nodes, including the supervisory node(s) 110, client node(s) 120 and/or other node(s) 130, must agree that the transaction is valid over a signature. Accordingly, in some embodiments, the nodes, including the supervisory node(s) 110, client node(s) 120 and/or other node(s) 130, may store the entire blockchain ledger 115 and validate all transactions and blocks to ensure the network's security and integrity by independently verifying transactions.

In some embodiments, one or more of the nodes, including the supervisory node(s) 110, client node(s) 120 and/or other node(s) 130, may validate some or all transactions. Nodes, including the supervisory node(s) 110, client node(s) 120 and/or other node(s) 130, validate transactions by checking if they adhere to the network's rules (e.g., ensuring the sender, recipient and/or transaction conform to certain criteria). Validating transactions may include verifying signature that sign the transactions to ensure validity.

In some embodiments, one or more of the nodes, including the supervisory node(s) 110, client node(s) 120 and/or other node(s) 130, may also or instead validate blocks of the blockchain ledger 115. In some embodiments, Nodes verify new blocks by using one or more consensus mechanisms and ensuring all transactions within the block are valid. Consensus mechanisms may include one or more protocols used in the blockchain network to achieve agreement on the state of the blockchain ledger 115 among the nodes, including the supervisory node(s) 110, client node(s) 120 and/or other node(s) 130, The consensus mechanism(s) ensure that all participants in the network agree on the validity of transactions and the order in which they are added to the blockchain.

In some embodiments, the consensus mechanism(s) may include Proof of Work (PoW), such as in Bitcoin™, Ethereum™ or others. In PoW, the nodes, including the supervisory node(s) 110, client node(s) 120 and/or other node(s) 130, (miners) compete to solve a complex mathematical problem. The first to solve may be enabled to add the next block to the blockchain ledger 115 and be rewarded with cryptocurrency.

In some embodiments, the consensus mechanism(s) may include Proof of Stake (POS), such as in Ethereum™ 2.0, Cardano™ or others. In some embodiments, PoS may include validators selected from amongst the nodes, including the supervisory node(s) 110, client node(s) 120 and/or other node(s) 130, create new blocks based on the number of coins they hold and are willing to "stake" as collateral. The more coins staked, the higher the chance of being selected.

In some embodiments, the consensus mechanism(s) may include Delegated Proof of Stake (DPOS), such as in EOS™, TRON™ or others. In DPOS, nodes, including the supervisory node(s) 110, client node(s) 120 and/or other node(s) 130, associated with coin holders vote for a small number of delegates who are responsible for validating transactions and creating new blocks.

In some embodiments, the consensus mechanism(s) may include Practical Byzantine Fault Tolerance (PBFT), such as in Hyperledger Fabric, Zilliqa, or others. In some embodiments, in PBFT, nodes, including the supervisory node(s) 110, client node(s) 120 and/or other node(s) 130, communicate with each other to agree on the state of the blockchain. A block is added when a supermajority (e.g., two-thirds) of nodes, including the supervisory node(s) 110, client node(s) 120 and/or other node(s) 130, agree.

In some embodiments, the consensus mechanism(s) may include Proof of Authority (PoA), such as in VeChain, POA Network or others. In some embodiments, in PoA, a limited number of pre-approved nodes, including the supervisory node(s) 110, client node(s) 120 and/or other node(s) 130, termed validators or authorities, create new blocks. Validators are chosen based on their identity and reputation.

In some embodiments, the consensus mechanism(s) may include Proof of Burn (PoB), such as in Slimcoin™ among others. In some embodiments, in PoB, users associated with nodes, including the supervisory node(s) 110, client node(s) 120 and/or other node(s) 130, "burn" (destroy) a certain amount of cryptocurrency to gain the right to mine or validate transactions. This demonstrates their commitment to the network.

In some embodiments, the consensus mechanism(s) may include Proof of Capacity (PoC), such as in Burstcoin™ among others. In some embodiments, in PoC nodes, including the supervisory node(s) 110, client node(s) 120 and/or other node(s) 130, may allocate hard drive space to solve a cryptographic challenge. The more space allocated, the higher the chance of mining a block.

In some embodiments, the consensus mechanism(s) may include Proof of Elapsed Time (PoET), such as in Hyperledger Sawtooth™ among others. In some embodiments, in PoET, nodes, including the supervisory node(s) 110, client node(s) 120 and/or other node(s) 130, may wait for a randomly assigned time before creating a new block. The first to finish waiting gets to add the block.

In some embodiments, the nodes, including the supervisory node(s) 110, client node(s) 120 and/or other node(s) 130, may communicate with each other using a peer-to-peer (P2P) network, though other networks may be employed. Indeed, in some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet. This decentralized communication ensures that there is no single point of failure and that the network remains robust and secure.

In some embodiments, upon transactions and blocks being validated, a new block may be added to the blockchain ledger 115 via a cryptographic hash of the previous block, a timestamp, and transaction data specifying the validated transactions submitted since the last block. Hashing ensures the integrity and immutability of the blockchain.

In some embodiments, the supervisory node 110 may be a particular node or set of nodes on a permissioned or consortium blockchain where certain nodes are given special roles to ensure compliance, security, and governance. These nodes help balance the benefits of blockchain technology with the need for oversight and control in specific use cases.

In some embodiments, the supervisory node 110 may have elevated permissions compared to regular client nodes 120, such as the ability to validate transactions, manage network configurations, or oversee the implementation of smart contracts, monitor network activity and audit transactions to ensure compliance with predefined rules and regulations.

In some embodiments, the supervisory node 110 may include a mint 111 functionality, control and/or management of smart contract(s) 112 available to the decentralized blockchain network 101, management of wallet(s) 113 of users on the decentralized blockchain network 101, including hosting one or more wallet(s) 113 on behalf of users, among other administrative and supervisory functions.

In some embodiments, the client node 120 may include the same or different smart contract(s) 112 and the same ledger 115. As such, the nodes, including the supervisory node 110, the client node 120 and/or other node(s) 130 may engage in consensus via one or more consensus mechanisms to ensure the validity of information on a shared ledger 115, via the blockchain. Additionally, the client node 120 may include a user's wallet 123, cryptographic functionality associated with the wallet 123, and, in some embodiments, one or more distributed applications (dApps) 121 installed on the client node 120.

In some embodiments, the supervisory node 110 may manage, distribute, create and/or delete the smart contracts 112 available across the network 101. In some embodiments, the smart contract(s) 112 may include various scripts in a scripting language of the blockchain network that are executable by one or more of the nodes 110, 120 through 130, for instance with verifiable computing protocols in which a plurality (like all) of the nodes 110, 120 through 130 execute an instance of the smart contract 112 and compute a consensus result of the computation with the consensus protocols described herein, such that no single computing node needs to be trusted.

In some embodiments, "smart contracts" refer to programs executable by computing nodes of the blockchain computing platform, which in some cases may be tamper-evident, immutable decentralized programs loaded to the blockchain network by one of the components of the environment. For example, the supervisory node 110 may publish a smart contract 112 to the decentralized computing network 101 such that the client node 120 (or other nodes 130) may process information stored in the ledger 115, or other information, according to one or more operations enumerated in the smart contract 112. The options enumerated in the smart contract 112 may govern various activities within the context of the environment, such as digital bear asset creation, allocation, and the like. A smart contract 112 can be a contract in the sense that the logic of the smart contract is immutable in some implementations once loaded to the blockchain network 101, and thus serves as a form of a commitment to a particular body of logic.

In some embodiments, the wallet(s) 113 and 123 may include a means to securely store, manage, and transact digital assets, e.g., via one or more private key and public key pairs, including e.g., an address on the blockchain network 101 derived therefrom. In some embodiments, the wallet(s) 113 and 123 stores the cryptographic key pair(s) that are used to access and manage digital assets on the blockchain. For example, the wallet(s) 113 and 123 may include one or more "hot" wallets connected to the network 101, which may be more convenient for frequent activities. In another example, the wallet(s) 113 and 123 may include one or more "cold" wallets not connected to the internet, making them more secure against online threats.

In some embodiments, a user may self-host their wallet 123 on the client node 120, though in some embodiments, one or more users may have the supervisory node 110 or another platform server or computing device host their wallet(s) 113 on their behalf. In some embodiments, whether self-hosted or hosted by the supervisory node 110, the user may act on the blockchain network 101 via the cryptographic key pair associated with their wallet, and the wallet may be configured to maintain a history of the activities, e.g., including activities, dates, other users associated with the activities, etc. Furthermore, in the context of transactions of digital assets and/or cryptocurrencies, the wallet(s) 113 and/or 123 may track a balance associated with the wallet(s) 113 and/or 123.

In some embodiments, activities relative to a given wallet 113 and/or 123 may be entered into a block of the blockchain ledger 115 upon consensus by the participating nodes 110, 120 through 130. As detailed above, consensus can include one or more consensus mechanisms including, e.g., PoW, POS, etc.

In some embodiments, the dApp 121 may include one or more software applications that runs on the blockchain network 101. Unlike traditional applications that rely on centralized servers, dApps leverage the distributed nature of blockchain technology to enhance security, transparency, and resilience including by storing data on the blockchain ledger 115. The dApp 121 may include one or more smart contracts handling the logic and operations of the application in a decentralized manner, or other programming facility on the blockchain network 101. In some embodiments, the dApp 121 may include or otherwise utilize (e.g., as a resource, function, services, etc.) one or more of the smart contract(s) 112. Indeed, in some embodiments, one or more of the smart contract(s) 112 or dApp 121 or any combination thereof may perform token event orchestration, e.g., based on conditions detected by an oracle 114.

In some embodiments, the smart contract(s) 112 and/or dApp 121 may be leveraged to perform operations on the blockchain ledger 115 based on conditions detected by the oracle 114. In some embodiments, the supervisory node 110 may include an oracle 114. The oracle 114 may be a software construct configured to monitor off-chain and/or on-chain events, thus enabling integration with one or more external data sources 160. In some embodiments, the oracle 114 may be implemented on the same physical infrastructure as the supervisory node 110, or on any one or more of the client node 120 or other nodes 130, or in a distributed fashion across all nodes 110, 120 through 130, or on distinct hardware, or any combination thereof. Typically, blocks are added to the ledger 115 in predefined or regular periods, while events off-chain, such as physical activities, news events, financial events, etc., may occur irregularly or on a different interval. This asynchronous relationship makes it difficult to orchestrate token minting operations and distribution in a fair and deterministic manner.

Accordingly, the oracle 114 may monitor the external data source 160 for the occurrence of one or more trigger conditions. In some embodiments, the oracle 114 may communicate with the external data source 160 via one or more computer interface and/or messaging technologies such as, e.g., a messaging protocol, a networking protocol, one or more application programming interfaces (APIs), or other suitable technique for communicating between computing systems or any combination thereof. For example, the oracle 114 may interact with the [external data source 160 over a network (e.g., network 101 or other network) including the Internet using the HyperText Transport Protocol (HTTP) to communicate one or more API requests to cause the oracle 114 to track the off-chain activity. In another example, the oracle 114 is connected to the external data source 160 via a local network, such as, e.g., Ethernet, Local Area Network (LAN), wireless LAN (WLAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages).

In some embodiments, the external data source 160 may provide activity and/or event information for one or more types of activities and/or events. For example, the activities and/or events may include, e.g., human activities, movement and/or user of tokenized physical items, interest and/or value changes of financial assets, price feeds, weather conditions, sports scores, supply chain tracking, occurrences in one or more scenarios such as supply chain events, financial agreements, artistic creations and/or publishing, application deployment, among other activities and/or events for which a trigger condition may be identified to cause the performance of one or more on-chain activities. In some embodiments, the trigger condition(s) may include the occurrence of a particular event and/or the expiration of a period of time.

In some embodiments, the oracle 114 may be configured to monitor for a particular event, activity, or event/activity type or other occurrence or any combination thereof. Accordingly, the oracle 114 may request or otherwise access data via the external data source 160 to determine when the occurrence took place.

In some embodiments, based on the time and/or date of the occurrence, the oracle 114 may trigger one or more smart contracts 112 and/or dApps 121 to access the ledger 115 may monitor the blockchain. In some embodiments, the smart contracts 112 and/or dApps 121 may determine a period associated with the occurrence ("occurrence period") 118 within the length of the blockchain 117. The occurrence period 118 may include each block in the blockchain within a period of time associated with the occurrence. For example, the occurrence period 118 may be an amount of time and/or number of blocks since a previous occurrence. In another example, the occurrence period 118 may be a predetermined period of time or number of blocks different from the occurrence. In another example, the occurrence period 118 may be a period of time or number of blocks associated with a predetermined number of occurrences.

In some embodiments, based on the number of blocks in the occurrence period 118 and a resulting on-chain operation associated with the occurrence, the smart contracts 112 and/or dApps 121 may determine a portion of the on-chain operation attributable to each block in the occurrence period 118. In some embodiments, the portion of the on-chain operation may be based on a number of transactions in each block, a total balance of the wallets associated with transactions in each block, a total volume of transactions in each block, or other quantification of activity within each block. In some embodiments, the on-chain operation may include a distribution of tokens (e.g., cryptocurrency, non-fungible tokens, tokenized assets, etc.), a user-specific operation such as tokenizing new assets based on user activities in the occurrence period, among others or any combination thereof. For example, the smart contracts 112 and/or dApps 121 may distribute tokens based on the activities of one or more users within the occurrence period, for example to distribute activity-based rewards, interest, accrued value of tokenized assets, among others or any combination thereof.

In some embodiments, the smart contracts 112 and/or dApps 121 may also or alternatively determine on-chain operations to be performed based on activity within a particular block. For example, the smart contracts 112 and/or dApps 121 may determine a metric associated with activity by one or more users at a particular time within the occurrence period 118 relative to a threshold level of activity according to the metric.

Accordingly, in some embodiments, the oracle 114, based on a monitoring of the external data source 160, may identify one or more trigger conditions, obtain data related to the trigger condition, and orchestrate the one or more smart contracts 112 and/or dApps 121 to perform inter-block and/or intra-block-based operations. In some embodiments, such operations may include a mint 111 of new tokens for distribution based on a quantity, timing, and/or frequency of activities on the blockchain within the occurrence period.

In some embodiments, the mint 111 may include creating new digital assets based on the off-chain trigger condition and the occurrence period 118. Minting may include generating new tokens by validating data, creating new blocks, and recording this information onto the blockchain, e.g., using one or more consensus mechanisms as detailed above. In some embodiments, the minted tokens may be fungible or non-fungible, and may represent any one or more of various assets, such as, without limitation, digital currencies, loyalty points, or real-world assets like real estate or artwork, among others or any combination thereof. Based on the trigger condition, the tokens may be attributable to one or more users. Accordingly, the one or more smart contracts 112 and/or dApps 121 submit one or more transactions to move the minted token(s) to the associated one or more users, e.g., by listing the users' wallet(s) as the recipient of the newly minted tokens. Thus, the one or more smart contracts 112 and/or dApps 121 may effectuate on-chain activities based on the off-chain activities monitored by the oracle 114.

Figure 2:
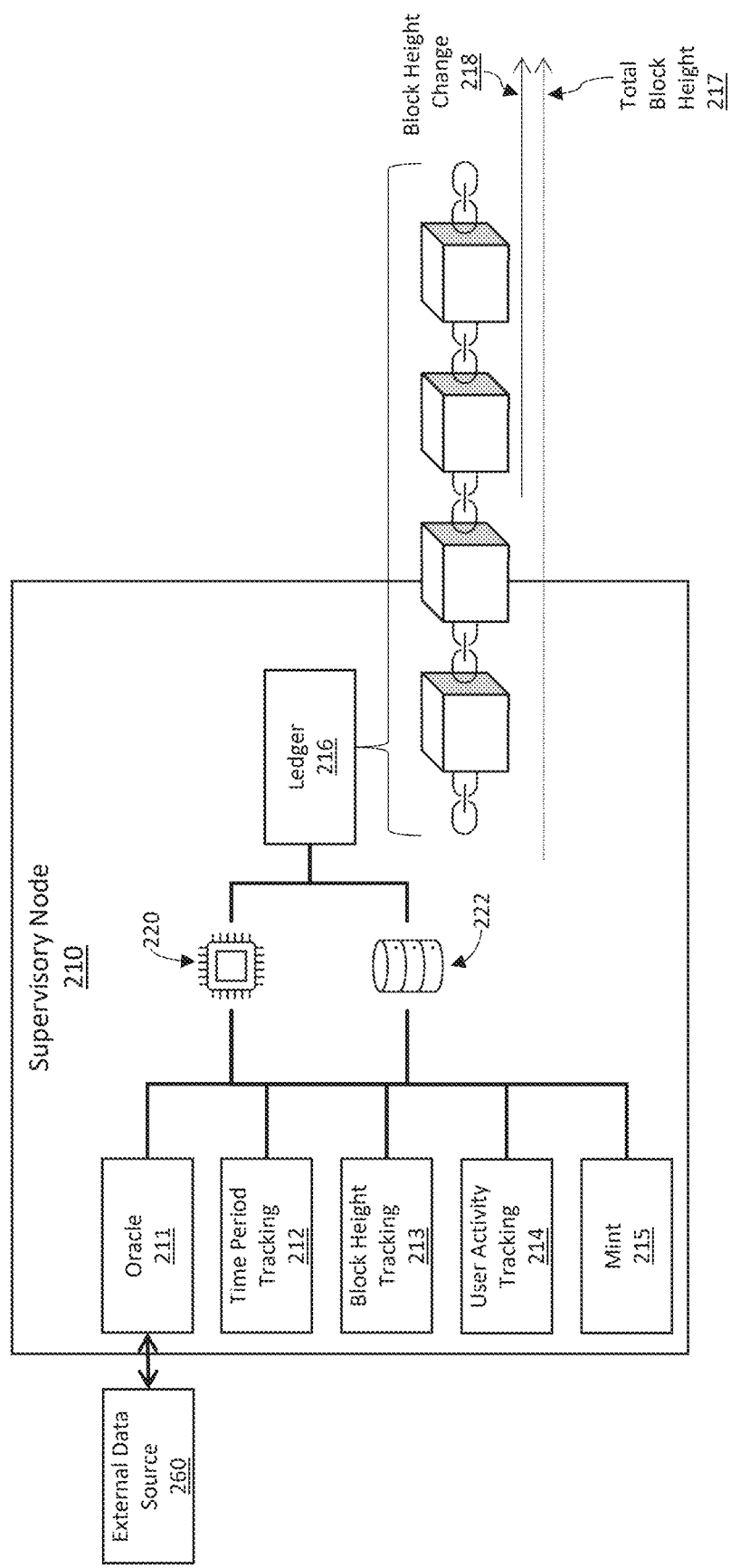
FIG. 2 depicts an exemplary supervisory node of blockchain environment configured to monitoring of on-chain and off-chain events for coordinated token minting and/or distribution events in accordance with one or more embodiments of the present disclosure.

Referring to FIG. 2, an exemplary supervisory node of blockchain environment configured to monitoring of on-chain and off-chain events for coordinated token minting and/or distribution events is depicted in accordance with one or more embodiments of the present disclosure.

In some embodiments, a supervisory node 210, e.g., the supervisory node 110 detailed above, may be configured to implement a cryptographic data record oracle (e.g., an "oracle") 211 (e.g., the oracle 114 detailed above) to monitor off-chain and on-chain activities to provide orchestrated token minting and/or distribution. To do so, the supervisory node 210 may include an oracle 211 and one or more additional smart contracts for time period tracking 212, block height tracking 213 of the blocks in the blockchain ledger 216, user activity tracking 214 in each block of the ledger 216 and minting 215 tokens on the ledger 216.

In some embodiments, the supervisory node 210 may include hardware components such as a processor 220, which may include local or remote processing components. In some embodiments, the processor 220 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 220 may include data-processing capacity provided by the microprocessor. In some embodiments, the microprocessor may include memory, processing, interface resources, controllers, and counters. In some embodiments, the microprocessor may also include one or more programs stored in memory.

Similarly, the supervisory node 210 may include storage 222, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 222 may include, e.g., a suitable non-transient computer readable medium such as, e.g., random access memory (RAM), read only memory (ROM), one or more buffers and/or caches, among other memory devices or any combination thereof.

In some embodiments, the supervisory node 210 may implement computer engines for oracle 211, time period tracking 212, block height tracking 213, user activity tracking 214 and minting 215. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each computer engine/smart contract may include dedicated and/or shared software components, hardware components, or a combination thereof. However, in some embodiments, one or more of the computer engines/smart contracts may share hardware resources, including the processor 220 and storage 222 of the supervisory node 210 via, e.g., a bus.

In some embodiments, the oracle 211 may interface with an external data source 260 to monitor off-chain activities, such as, e.g., a real-world condition (e.g., financial value of an asset, interest accrual, sporting event results, esports results, project management, user performance in one or more real-world tasks, etc.). In some embodiments, the external data source 260 may include one or more data providers, such as, e.g., a news source or publication, financial data source, stock market, weather service, sports journalist source, asset exchange platforms, content delivery networks, streaming platforms, ecommerce and physical store systems, among other external data sources or any combination thereof. Thus, the oracle 211 may monitor events in one or more real-world scenarios.

The oracle 211 may be configured to identify the occurrence of a particular condition (the "trigger condition") which may be a trigger for on-chain operations in response to the real-world condition. Indeed, the blockchain may be used to tokenize events, activities and/or items. The oracle 211, and its monitoring of the external data source 260, may provide a connection between the off-chain and the on-chain activities.

In some embodiments, the trigger condition may occur once or repeatedly, such as on a regular or irregular period. In some embodiments, for example, the trigger condition may be associated with an event that is scheduled to occur once per day, week, month or year, or on any other periodic basis or any other timing or combination thereof. In some embodiments, the trigger condition may occur based on additional factors, such as weather, athlete performance, threshold values for valuation, balance, interest accrual, asset value, project progress, among others or any combination thereof. In some embodiments, the trigger condition may be associated with the performance of a particular activity, such as the creation and/or publishing a work of art, literature and/or research/development.

In some embodiments, the oracle 211 may retrieve data regarding the real-world condition on a periodic basis to determine whether the trigger condition has occurred. For example, the periodic basis may be a one day, two-day, three-day, four-day, five-day, six-day, seven-day, two-week, three week, four week, one month or more basis or any other period or any combination thereof. Alternatively, or in combination, the oracle 211 may receive, automatically, a notification from the external data source 260 upon the occurrence of the trigger condition.

In some embodiments, the occurrence of the trigger condition may be associated with the distribution of new tokens to users on the blockchain platform. Accordingly, upon the trigger condition occurring, the supervisory node 210 may perform time period tracking 212 of the blockchain. Indeed, the time-period tracking 212 may determine a time period associated with the occurrence of the trigger condition, such as preconfigured time period, a time since a previous occurrence of the trigger condition, time period reported by the external data source 260, or other time period. Thus, the time-period tracking 212 may determine the off-chain time period associated with the trigger condition in the real-world condition.

In some embodiments, based on the time period, the supervisory node 210 may perform block height tracking 213 to determine a block height and/or block height change within the time period. For example, the block height tracking 213 may determine a number of blocks added to the ledger 216 since a previous trigger condition to determine the block height change 218 during the time period within the total block height 217.

In some embodiments, the supervisory node 210 may perform user activity tracking 214 of on-chain user activity during the time period based on the block height change 218. In particular, the user activity tracking 214 may measure balance changes of token balances attributable to each user based on activities performed on the ledger 216 with respect to the users' cryptographic data record ("wallet", e.g., wallet 123 and/or 113). For example, the supervisory node 210 may maintain a log of cryptographic data record balances as activities including moving tokens are performed relative to each cryptographic data record. Alternatively, or in addition, the ledger 216 may record for each cryptographic data record, a running balance in each block in which a cryptographic data record is involved in activities.

In some embodiments, user activity tracking 214 may include measuring a total activity that occurs within each block according to one or more metrics. For example, the metric may include volume and/or value of token movements, total balance of tokens across users, frequency of token movements, among other metrics or any combination thereof. Based on a ratio of the metric per block to the metric aggregated across blocks for the time period, a proportion of new tokens apportioned to each block may be determined.

In some embodiments, the proportion of tokens for each block may be further apportioned to each user associated with each block. For example, based on the ratio of the metric for a particular block and the user-level metric of activity for each user within the particular block, the proportion of tokens assigned to the particular block may be divided into sub-portions, each sub-portion being assigned to each user, e.g., based on the cryptographic data record address of each user (e.g., the wallet address).

In some embodiments, the supervisory node 210 may perform minting 215 (e.g., via the mint 111 functionality detailed above) to produce, into each cryptographic data record address in each block, the sub-portion of the portion of the new cryptographic tokens. In particular, the minting 215 may, in a new block on the cryptographic data record, based at least in part on a validation of the new cryptographic tokens according to at least one consensus protocol, create and sign transactions moving the new tokens in each respective cryptographic data record. Each transaction may be representative of generating of the sub-portion of the portion of the new cryptographic tokens in each cryptographic data record address.

As a result, the off-chain events may be monitored, identified and used to create associated on-chain activities through time and token orchestration via an oracle and one or more smart contracts.

Figure 3:
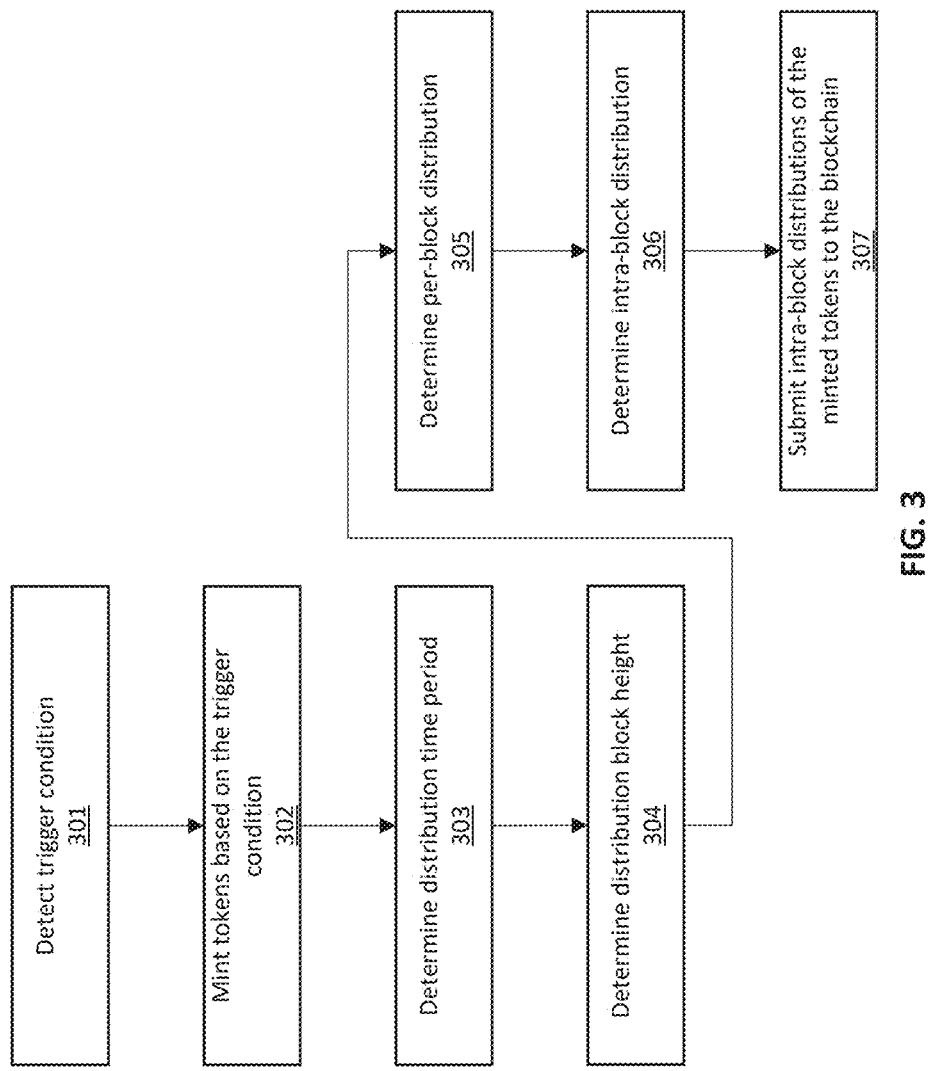
FIG. 3 is a flowchart illustrating a method for monitoring of on-chain and off-chain events for coordinated token minting and/or distribution events in accordance with one or more embodiments of the present disclosure.

Referring to FIG. 3, a flowchart illustrating a method for monitoring of on-chain and off-chain events for coordinated token minting and/or distribution events is depicted in accordance with one or more embodiments of the present disclosure.

In some embodiments, one or more nodes of a blockchain platform may use an oracle, at step 301 to detect a trigger condition. The trigger condition may be associated with the occurrence of an off-chain event, and may include trigger condition data such as, e.g., an occurrence type, an occurrence identifier, an occurrence time, an occurrence data, an occurrence duration, a quantity, value, amount or other metric associated with one or more events or activities of the occurrence, one or more user identifiers associated with one or more users involved in the occurrence (e.g., participants or affected users), among other data or any combination thereof.

In some embodiments, based on the trigger condition data, the one or more nodes of a blockchain platform may, at step 302, mint tokens based on the trigger condition, including the trigger condition data. For example, the node(s) may identify an amount, value or quantity associated with the trigger condition based on the trigger condition data and determine a number of tokens associated with the amounts, value or quantity.

In some embodiments, the one or more nodes of a blockchain platform may, at step 303, determine a distribution time period associated with the trigger condition. For example, the trigger condition may be associated with an occurrence duration based on off-chain activity. Thus, the node(s) may determine the off-chain time period, as measured by time since a last occurrence, number of occurrences, or other timing metric or any combination thereof. Based thereon, the node(s) may determine the distribution time period defining the distribution time period.

In some embodiments, the one or more nodes of a blockchain platform may, at step 304, determine a distribution block height and/or block height change. For example, the trigger condition may be associated with an occurrence duration. Thus, the node(s) may determine the on-chain time period, as measured by time, number of blocks added, or other timing metric or any combination thereof. Based thereon, the node(s) may determine the block height and/or block height change associated with the distribution time period (e.g., the blocks added since the distribution time period began).

In some embodiments, the one or more nodes of a blockchain platform may, at step 305, determine a per-block distribution. The block height and/or block height change may include multiple blocks with each block having a different quantity of tokens (e.g., balance), quantity of activity and/or quantity of one or more types of activity, or other metric of activity in each block. As such, a different amount of the tokens associated with the trigger condition may be attributable to each block. The one or more nodes may attribute a portion of the tokens based on the metric of activity of each block, e.g., by summing activity across the blocks, dividing the tokens by the summed activity, and multiplying for each block by the associated metric of each block.

In some embodiments, the one or more nodes of a blockchain platform may, at step 306, determine an intra-block distribution. Each block may include a number of users participating in on-chain activities. The portion of the tokens attributable to a particular block may be divided amongst the participants present in the particular block based on, e.g., a balance of each user, a metric of activity within the particular block of each user, or other metric or any combination thereof. Thus, after apportioning the tokens to each block, the portion of each block may be further apportioned to individual users.

In some embodiments, the one or more nodes of a blockchain platform may, at step 307, submit intra-block distributions of the minted tokens to the blockchain, e.g., by executing and/or submitting transactions to the blockchain transfer the portion of the tokens to each participant in each block in during the trigger condition time period based on steps 305 and 306 above.—

Figure 4:
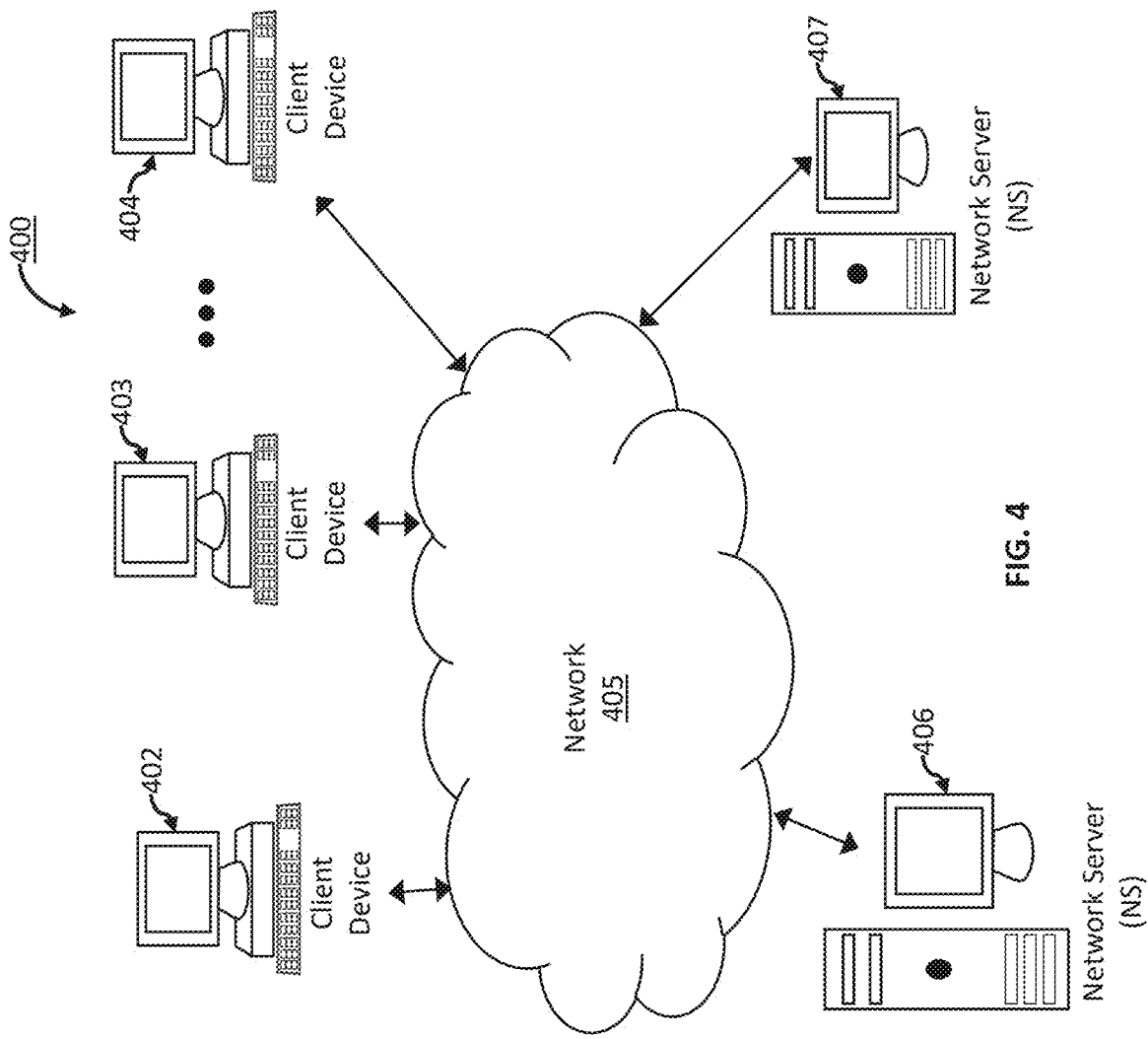
FIG. 4 depicts a block diagram of an exemplary computer-based system and platform for an exemplary blockchain environment configured to monitoring of on-chain and off-chain events for coordinated token minting and/or distribution events in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, client device 402, client device 403 through client device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the client devices 402 through 404 may be personal computers, multiprocessor systems, microprocessor-based or programmable consumer electronics, network PCs, and the like. In some embodiments, one or more client devices within client devices 402 through 404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 402 through 404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 402 through 404 may run one or more applications, such as Internet browsers, mobile applications, voice calls, video games, videoconferencing, and email, among others. In some embodiments, one or more client devices within client devices 402 through 404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 402 through 404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 402 through 404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 401 through 404.

In some embodiments and, optionally, in combination of any embodiment described above or below, for example, one or more exemplary computing client devices 402 through 404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Example—Distribution of Interest

In some embodiments, the oracle 114 and/or 211 and external data source 160 and/or 260 detailed above with regards to the supervisor node 110 and 210—may be configured to monitor off-chain events including interest accrual via the external data source 160 and/or 260 in order to schedule and trigger an on-chain event including token minting and distribution on the ledger 115 and/or 216.

The holding of tokens in an account (e.g., wallet 113 and/or wallet 123) on the blockchain ledger 115 and/or 216 can represents an asset (directly or indirectly as a representation of a real-world asset (RWA)). Certain assets generate income or payment streams (e.g., interest, distributions) that may be distributed to the holders of the token. Often the accrual of income and the actual payout are not synchronized (e.g., interest is accrued daily, but payout of the interest income is done monthly). In addition, in many instances the owner of the asset on payout day receives all the accrued interest as a payout independent on the length of holding the asset. This is a typical use case/workflow in fixed income trading or dividend distributions in equities and participants during the transfer of assets prior a distribution calculates and need to agree to add the calculated amounts to the transfer prices. This poses a challenge in a blockchain network 101 that facilitates constant transfer of token on an ongoing real-time basis between participants with multiple transfers of the same token during the day as current systems are not able to distribute accrued income in a fair and deterministic manner.

Embodiments herein, enable a deterministic distribution of generated/accrued income based on the length of holding during the day independent from the actual payout date and time. The supervisory node 110 and/or 210 may receive (e.g., via an oracle 114 and/or 211 from an external data source 160 and/or 260) the information of the income for a specified time-period (e.g., daily). The oracle may include an entity that connects the blockchain ledger 115 and/or 216 to external systems, thereby enabling smart contracts 112 to execute based upon inputs and outputs from the real world. Upon receiving the actual payments in form of new tokens that need to be distributed to the holders of the token during the specified period, the smart contract 112 may determine the number of blocks executed within this period. The number of new tokens may be distributed amongst the number of blocks and further distributed to the wallets holding the eligible tokens within that block. In some embodiments, where the blocks are evenly spaced (e.g., a length of time to create a new block is the same for each block), the tokens may be allocated to the blocks evenly. In some embodiments, the blocks may be unevenly spaced (e.g., there is one or more variation to the length of time in creating at least one new block of the blocks, or, in other words, the length of time to create each new block is not always the same), and thus the new tokens may be distributed on a pro rata basis based on the time associated with the creation of each block. For example, each block may include a timestamp, and the time between each block may be difference between the timestamps of each adjacent block.

Thus, the time to create each block may be determined as the difference between the timestamp of a particular block and a preceding block.

In case that the payment includes multiple periods (e.g., all interest accrued between April 1st to April 30th—30 individual daily accruals) the supervisory node 110 and/or 210 and its smart contract 112 may pro-rata allocate the new tokens for each encompassed periods first before distributing the allocated tokens in the process before mentioned. Thus, the off-chain and on-chain monitoring including integration with the external data source may enable an example where participants can receive income that is generated from the asset holdings in a fair manner that is based on actual discrete holding times of the asset independent of the actual payment stream of the income. Transfers of assets can be performed without the need to calculate accrued income for held periods prior to the transfer and the incorporation in a transfer price.

In particular, for this example, a fund administrator may produce a daily (business day) trail balance that includes, e.g., General Ledger Accounts, Assets, Liabilities, Capital, Income Statement, Daily interest income (long- and short-term interest), Daily accrued expenses, Realized and unrealized Gains and Losses. Trail balance to trail balance net income changes are considered the proceeds earned for that period, and if the period between trail balances covers nonbusiness days, the net income is pro-rata divided for each included day. Interest is paid in kind (additional shares are issued) resulting in a change in Capital in the General Ledger upon booking, while Capital General Ledger account (e.g., wallets) reflects daily subscription and redemption and can be used for reconciliation purposes with token balances.

On the distribution day, a fund administrator may calculate the shares to be newly issued as the number of shares being equal to proceeds to be distributed divided by accrual. A Transfer Agent may issue the number of new shares as tokens on the blockchain network, e.g., to a Broker Dealer custodial Omnibus account as calculated by the fund administrator. The supervisory node may then create representation of share token one-to-one (e.g., mint the tokens on the blockchain).

In particular, the oracle may calculate pro-rata distribution of Token for each interval using the following formula:

$$\text{\# of Token for Interval } x = \text{Total \# of Token distrubuted} * \frac{\text{Accrued proceeds Interval } x}{\sum_{i=1}^{n} \text{Accrued proceeds Interval } i}$$

with i being interval and n the number of all intervals within specified period.

The oracle may then calculate pro-rata distribution of Interval x Tokens to individual blocks within Interval x:

$$(\text{\# of Token for Block } y) = (\text{Total \# of Token for day}) * \frac{\text{timestamp block } y - \text{timestamp block } y - 1(\text{previous block})}{\text{timestamp last block day} - \text{timestamp last block previous day}}$$

The oracle may then calculate pro-rata distribution of Block y Tokens to individual wallet balances within Block y:

$$\text{\# of Token for wallet } z = \text{Total \# of Token for Block } y = * \frac{\text{existing Block } y \text{ Token balance wallet } z}{\text{sum of all Block } y \text{ Token balances of all existing wallets}}$$

The oracle may then calculate total token amount distributed to each wallet:

$$\text{Total \# of Token for wallet } z = \sum_{i=1}^{n} \sum_{b=a}^{m} \text{Total \# of Token for wallet } z \text{ Interval } i \text{ Block } b$$

With i being Interval and n the number of considered intervals in the distribution, and with b being the block number starting with a being the first block of interval sequence i and m being the last block.

A minting may then credit the calculated token amount for each wallet for the Interval sequence by minting new token into that wallet.

Indeed, according to the present example, as well as any embodiment detailed above, the supervisory node 110 and/or 210 may track all transactions and token holdings on the blockchain ledger 115 and/or 216 in a discrete block by block manner. The smart contract 112 can receive all necessary information of income from the oracle that may provide information daily (e.g., daily interest accrual of a treasury fund). The actual payment of the earned income at a later point in time (e.g., monthly payout) in form of newly minted token can be distributed based on the information of the oracle and the recorded balances and transaction on a block-by-block basis. In addition, the supervisory node 110 and/or 210 may perform the calculations in a DeFI system and is not dependent on a centralized model. It enhanced the precision and fairness of income distribution based on actual discrete holding periods. In contrast, typically in a distributed ledger environment the distribution of yield is calculated based on closing books once a day and determining the ownership and amount in such way in a centralized system.

As such, embodiments herein, including the present example, allow participants to receive distributed interest (or other proceeds) based on the actual holding period of the yield producing asset (and its token representation on the DEFI Network). On the supervisory node 110 and/or 210 this capability may allow for deterministic distribution of interest (or other proceeds) to participants based on their actual holding period. This process eliminates the ability of gaming the system by holding the asset token until right after a daily cutoff in traditional systems or the timing of transfer to other participants in order to gain an advantage of receiving the interest for a complete day as opposed to only the actual holding period. In addition, the method allows for asynchronous distribution of proceeds between calculation and earning of the interest and the actual payout at a later point in time while still guaranteeing the fair distribution.

In some embodiments, a time-based distribution model based on seconds or sub seconds could be implemented. Such an arrangement may be non-deterministic on the exact holding period and thus would not be able to achieve the same results but may still solve the problem with sufficient accuracy.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11)

WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: determining, by at least one processor, using at least one cryptographic data record oracle associated with monitoring at least one real-world condition, a trigger condition associated with creating new cryptographic tokens on a cryptographic data record; and creating, by the at least one processor, the new cryptographic tokens into a plurality of cryptographic data record addresses in response to the trigger condition, the creating comprising: determining, by the at least one processor, a block height of the blocks added to the cryptographic data record since a previous trigger condition; determining, by the at least one processor, a portion of the new cryptographic tokens for each block based at least in part on the block height; determining, by the at least one processor, for each cryptographic data record address in each block from the plurality of cryptographic data record address, a sub-portion of the portion of the new cryptographic tokens for each block; and generating, by the at least one processor, into each cryptographic data record address in each block, the sub-portion of the portion of the new cryptographic tokens.

Clause 2. The method of clause 1, further comprising: retrieving, by the at least one processor, on a periodic basis, the at least one real-world condition from the at least one cryptographic data record oracle.

Clause 3. The method of clause 2, wherein the periodic basis comprises a one-day period.

Clause 4. The method of clause 2, wherein the trigger condition comprises a period of the periodic basis having elapsed.

Clause 5. The method of clause 2, wherein the trigger condition comprises a cryptographic token creation period having elapses, the cryptographic token creation period being different from a period of the periodic basis having elapsed.

Clause 6. The method of clause 1, further comprising: generating, by the at least one processor, a new block on the cryptographic data record based at least in part on a validation of the new cryptographic tokens according to at least one consensus protocol; wherein the cryptographic data record comprises a blockchain; and wherein the new block comprises a plurality of transactions representative of the generating of the sub-portion of the portion of the new cryptographic tokens in each cryptographic data record address.

Clause 7. The method of clause 1, further comprising: determining, by the at least one processor, the portion of the new cryptographic tokens for each block based at least in part on a total cryptographic token balance of each block; and determining, by the at least one processor, for each cryptographic data record address in each block from the plurality of cryptographic data record address, a sub-portion of the portion of the new cryptographic tokens for each block based at least in part on an address-specific token balance of each cryptographic data record address in each block.

Clause 8. A non-transitory computer-readable medium having software instructions stored thereon, wherein the software instructions are configured to, upon execution, cause at least one processor to perform a method comprising: determining, using at least one cryptographic data record oracle associated with monitoring at least one real-world condition, a trigger condition associated with creating new cryptographic tokens on a cryptographic data record; and creating the new cryptographic tokens into a plurality of cryptographic data record addresses in response to the trigger condition, the creating comprising: determining a block height of the blocks added to the cryptographic data record since a previous trigger condition; determining a portion of the new cryptographic tokens for each block based at least in part on the block height; determining for each cryptographic data record address in each block from the plurality of cryptographic data record address, a sub-portion of the portion of the new cryptographic tokens for each block; and generating into each cryptographic data record address in each block, the sub-portion of the portion of the new cryptographic tokens.

Clause 9. The non-transitory computer-readable medium of clause 8, wherein the method further comprises: retrieving on a periodic basis, the at least one real-world condition from the at least one cryptographic data record oracle.

Clause 10. The non-transitory computer-readable medium of clause 9, wherein the periodic basis comprises a one-day period.

Clause 11. The non-transitory computer-readable medium of clause 9, wherein the trigger condition comprises a period of the periodic basis having elapsed.

Clause 12. The non-transitory computer-readable medium of clause 9, wherein the trigger condition comprises a cryptographic token creation period having elapses, the cryptographic token creation period being different from a period of the periodic basis having elapsed.

Clause 13. The non-transitory computer-readable medium of clause 8, wherein the method further comprises: generating a new block on the cryptographic data record based at least in part on a validation of the new cryptographic tokens according to at least one consensus protocol; wherein the cryptographic data record comprises a blockchain; and wherein the new block comprises a plurality of transactions representative of the generating of the sub-portion of the portion of the new cryptographic tokens in each cryptographic data record address.

Clause 14. The non-transitory computer-readable medium of clause 8, wherein the method further comprises: determining the portion of the new cryptographic tokens for each block based at least in part on a total cryptographic token balance of each block; and determining for each cryptographic data record address in each block from the plurality of cryptographic data record address, a sub-portion of the portion of the new cryptographic tokens for each block based at least in part on an address-specific token balance of each cryptographic data record address in each block.

Clause 15. A system comprising: at least one processor in communication with at least one non-transitory computer readable medium having software instructions stored thereon, wherein the at least one processor, upon execution of the software instructions, is configured to perform steps comprising: determining, using at least one cryptographic data record oracle associated with monitoring at least one real-world condition, a trigger condition associated with creating new cryptographic tokens on a cryptographic data record; and creating the new cryptographic tokens into a plurality of cryptographic data record addresses in response to the trigger condition, the creating comprising: determining a block height of the blocks added to the cryptographic data record since a previous trigger condition; determining a portion of the new cryptographic tokens for each block based at least in part on the block height; determining for each cryptographic data record address in each block from the plurality of cryptographic data record address, a sub-portion of the portion of the new cryptographic tokens for each block; and generating into each cryptographic data record address in each block, the sub-portion of the portion of the new cryptographic tokens.

Clause 16. The system of clause 15, wherein the steps further comprise: retrieving on a periodic basis, the at least one real-world condition from the at least one cryptographic data record oracle.

Clause 17. The system of clause 16, wherein the trigger condition comprises a period of the periodic basis having elapsed.

Clause 18. The system of clause 16, wherein the trigger condition comprises a cryptographic token creation period having elapses, the cryptographic token creation period being different from a period of the periodic basis having elapsed.

Clause 19. The system of clause 15, wherein the steps further comprise: generating a new block on the cryptographic data record based at least in part on a validation of the new cryptographic tokens according to at least one consensus protocol; wherein the cryptographic data record comprises a blockchain; and wherein the new block comprises a plurality of transactions representative of the generating of the sub-portion of the portion of the new cryptographic tokens in each cryptographic data record address.

Clause 20. The system of clause 15, wherein the steps further comprise: determining the portion of the new cryptographic tokens for each block based at least in part on a total cryptographic token balance of each block; and determining for each cryptographic data record address in each block from the plurality of cryptographic data record address, a sub-portion of the portion of the new cryptographic tokens for each block based at least in part on an address-specific token balance of each cryptographic data record address in each block.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   monitoring, by at least one processor, at least one cryptographic ledger oracle for a real-world trigger condition associated with a change of at least one real-world asset;
   determining, by the at least one processor, based on the at least one cryptographic ledger oracle, an occurrence of the real-world trigger condition;
   creating, by the at least one processor, new cryptographic tokens corresponding to the change of the at least one real-world asset on a cryptographic ledger in response to the real-world trigger condition;
   performing, by the at least one processor, time period tracking of the cryptographic ledger to determine a plurality of time periods associated with the change of the at least one real-world asset of the real-world trigger condition based at least in part on a change in a block height of a plurality of blocks added to the cryptographic ledger since a previous trigger condition;
   determining, by the at least one processor, in each block since the previous trigger condition, a subset of a plurality of cryptographic ledger addresses associated with the at least one real-world condition;
      wherein each cryptographic ledger address of the plurality of cryptographic ledger addresses corresponds to a digital ledger wallet associated with a respective account of a respective user;
   determining, by the at least one processor, for each block since the previous trigger condition, an aggregate block quantity associated with the at least one real-world condition based at least in part on a block-specific account quantity of each cryptographic ledger address of the subset of the plurality of cryptographic ledger addresses associated with each block;
   determining, by the at least one processor, a portion of the new cryptographic tokens for each block since the previous trigger condition based at least in part on the change in the block height and the aggregate block quantity;
   determining, by the at least one processor, for each cryptographic ledger address associated with the at least one real-world condition in each block, a sub-portion of the portion of the new cryptographic tokens for each block based at least in part on the block-specific account quantity of each cryptographic ledger address of the subset of the plurality of cryptographic ledger addresses; and
   submitting, by the at least one processor, to the cryptographic ledger, at least one transaction to deposit, into each cryptographic ledger address, identified in each block, the sub-portion of the portion of the new cryptographic tokens to distribute the new cryptographic tokens across each respective digital ledger wallet associated with each respective account of each respective user based on the at least one real-world condition.

2. The method of claim 1, further comprising:
   retrieving, by the at least one processor, on a periodic basis, the at least one real-world condition from the at least one cryptographic ledger oracle.

3. The method of claim 2, wherein the periodic basis comprises a one-day period.

4. The method of claim 2, wherein the trigger condition comprises a period of the periodic basis having elapsed.

5. The method of claim 2, wherein the trigger condition comprises a cryptographic token creation period having elapsed, the cryptographic token creation period being different from a period of the periodic basis having elapsed.

6. The method of claim 1, further comprising:
   generating, by the at least one processor, a new block on the cryptographic ledger based at least in part on a validation of the new cryptographic tokens according to at least one consensus protocol;
   wherein the cryptographic ledger comprises a blockchain; and
   wherein the new block comprises a plurality of transactions representative of the generating of the sub-portion of the portion of the new cryptographic tokens in each cryptographic ledger address.

7. The method of claim 1, further comprising:
   determining, by the at least one processor, the portion of the new cryptographic tokens for each block based at least in part on a total cryptographic token balance of each block; and
   determining, by the at least one processor, for each cryptographic ledger address in each block from the plurality of cryptographic ledger addresses, a sub-portion of the portion of the new cryptographic tokens for each block based at least in part on an address-specific token balance of each cryptographic ledger address in each block.

8. A non-transitory computer-readable medium having software instructions stored thereon, wherein the software instructions are configured to, upon execution, cause at least one processor to perform a method comprising:
   monitoring at least one cryptographic ledger oracle for a real-world trigger condition associated with a change of at least one real-world asset;
   determining, based on the at least one cryptographic ledger oracle, an occurrence of the real-world trigger condition;
   creating new cryptographic tokens corresponding to the change of the at least one real-world asset on a cryptographic ledger in response to the real-world trigger condition;
   performing time period tracking of the cryptographic ledger to determine a plurality of time periods associated with the change of the at least one real-world asset of the real-world trigger condition based at least in part on a change in a block height of a plurality of blocks added to the cryptographic ledger since a previous trigger condition;
determining in each block since the previous trigger condition, a subset of a plurality of cryptographic ledger addresses associated with the at least one real-world condition;
wherein each cryptographic ledger address of the plurality of cryptographic ledger addresses corresponds to a digital ledger wallet associated with a respective account of a respective user;
determining, for each block since the previous trigger condition, an aggregate block quantity associated with the at least one real-world condition based at least in part on a block-specific account quantity of each cryptographic ledger address of the subset of the plurality of cryptographic ledger addresses associated with each block;
determining, a portion of the new cryptographic tokens for each block since the previous trigger condition based at least in part on the change in the block height and the aggregate block quantity;
determining, for each cryptographic ledger address associated with the at least one real-world condition in each block, a sub-portion of the portion of the new cryptographic tokens for each block based at least in part on the block-specific account quantity of each cryptographic ledger address of the subset of the plurality of cryptographic ledger addresses; and
submitting to the cryptographic ledger, at least one transaction to deposit, into each cryptographic ledger address, identified in each block, the sub-portion of the portion of the new cryptographic tokens to distribute the new cryptographic tokens across each respective digital ledger wallet associated with each respective account of each respective user based on the at least one real-world condition.

9. The non-transitory computer-readable medium of claim 8, wherein the method further comprises:
retrieving on a periodic basis, the at least one real-world condition from the at least one cryptographic ledger oracle.

10. The non-transitory computer-readable medium of claim 9, wherein the periodic basis comprises a one-day period.

11. The non-transitory computer-readable medium of claim 9, wherein the trigger condition comprises a period of the periodic basis having elapsed.

12. The non-transitory computer-readable medium of claim 9, wherein the trigger condition comprises a cryptographic token creation period having elapsed, the cryptographic token creation period being different from a period of the periodic basis having elapsed.

13. The non-transitory computer-readable medium of claim 8, wherein the method further comprises:
generating a new block on the cryptographic ledger based at least in part on a validation of the new cryptographic tokens according to at least one consensus protocol;
wherein the cryptographic ledger comprises a blockchain; and
wherein the new block comprises a plurality of transactions representative of the generating of the sub-portion of the portion of the new cryptographic tokens in each cryptographic ledger address.

14. The non-transitory computer-readable medium of claim 8, wherein the method further comprises:
determining the portion of the new cryptographic tokens for each block based at least in part on a total cryptographic token balance of each block; and
determining for each cryptographic ledger address in each block from the plurality of cryptographic ledger addresses, a sub-portion of the portion of the new cryptographic tokens for each block based at least in part on an address-specific token balance of each cryptographic ledger address in each block.

15. A system comprising:
at least one processor in communication with at least one non-transitory computer readable medium having software instructions stored thereon, wherein the at least one processor, upon execution of the software instructions, is configured to perform steps comprising:
monitoring at least one cryptographic ledger oracle for a real-world trigger condition associated with a change of at least one real-world asset;
determining, based on the at least one cryptographic ledger oracle, an occurrence of the real-world trigger condition;
creating new cryptographic tokens corresponding to the change of the at least one real-world asset on a cryptographic ledger in response to the real-world trigger condition;
performing time period tracking of the cryptographic ledger to determine a plurality of time periods associated with the change of the at least one real-world asset of the real-world trigger condition based at least in part on a change in a block height of a plurality of blocks added to the cryptographic ledger since a previous trigger condition;
determining in each block since the previous trigger condition, a subset of a plurality of cryptographic ledger addresses associated with the at least one real-world condition;
wherein each cryptographic ledger address of the plurality of cryptographic ledger addresses corresponds to a digital ledger wallet associated with a respective account of a respective user;
determining, for each block since the previous trigger condition, an aggregate block quantity associated with the at least one real-world condition based at least in part on a block-specific account quantity of each cryptographic ledger address of the subset of the plurality of cryptographic ledger addresses associated with each block;
determining, a portion of the new cryptographic tokens for each block since the previous trigger condition based at least in part on the change in the block height and the aggregate block quantity;
determining, for each cryptographic ledger address associated with the at least one real-world condition in each block, a sub-portion of the portion of the new cryptographic tokens for each block based at least in part on the block-specific account quantity of each cryptographic ledger address of the subset of the plurality of cryptographic ledger addresses; and
submitting to the cryptographic ledger, at least one transaction to deposit, into each cryptographic ledger address, identified in each block, the sub-portion of the portion of the new cryptographic tokens to distribute the new cryptographic tokens across each respective digital ledger wallet associated with each respective account of each respective user based on the at least one real-world condition.

16. The system of claim 15, wherein the steps further comprise:
retrieving on a periodic basis, the at least one real-world condition from the at least one cryptographic ledger oracle.

17. The system of claim 16, wherein the trigger condition comprises a period of the periodic basis having elapsed.

18. The system of claim 16, wherein the trigger condition comprises a cryptographic token creation period having elapsed, the cryptographic token creation period being different from a period of the periodic basis having elapsed.

19. The system of claim 15, wherein the steps further comprise:
generating a new block on the cryptographic ledger based at least in part on a validation of the new cryptographic tokens according to at least one consensus protocol;
wherein the cryptographic ledger comprises a blockchain; and
wherein the new block comprises a plurality of transactions representative of the generating of the sub-portion of the portion of the new cryptographic tokens in each cryptographic ledger address.

20. The system of claim 15, wherein the steps further comprise:
determining the portion of the new cryptographic tokens for each block based at least in part on a total cryptographic token balance of each block; and
determining for each cryptographic ledger address in each block from the plurality of cryptographic ledger addresses, a sub-portion of the portion of the new cryptographic tokens for each block based at least in part on an address-specific token balance of each cryptographic ledger address in each block.

\* \* \* \* \*